April 5, 1966     T. C. COPE     3,244,424
STUFFING BOX
Filed July 19, 1963     2 Sheets-Sheet 2
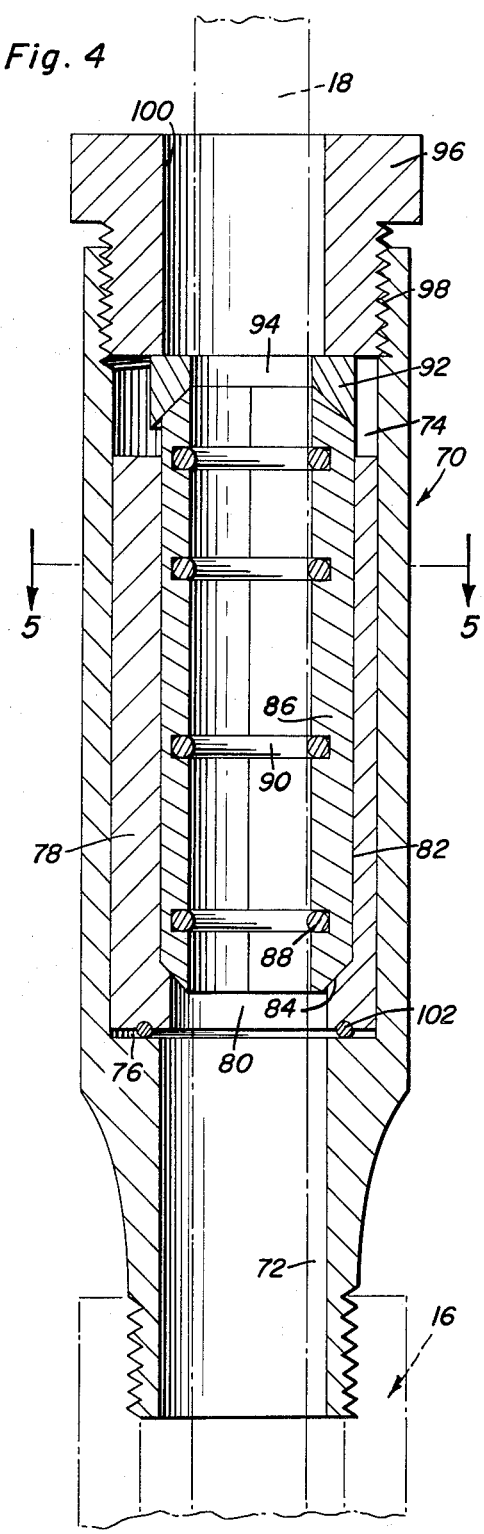
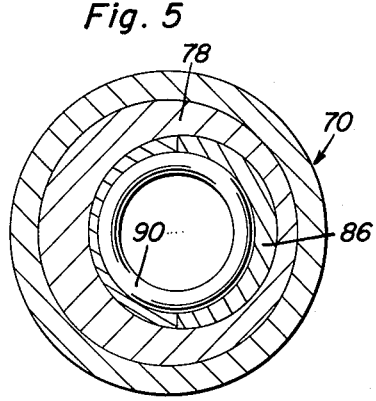
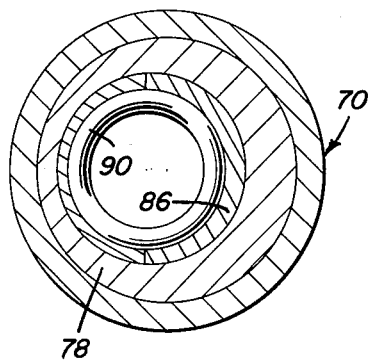
Thomas Claude Cope
INVENTOR.
BY *Clarence A. O'Brien*
*and Harvey B. Jackson*
Attorneys United States Patent Office 3,244,424
Patented Apr. 5, 1966

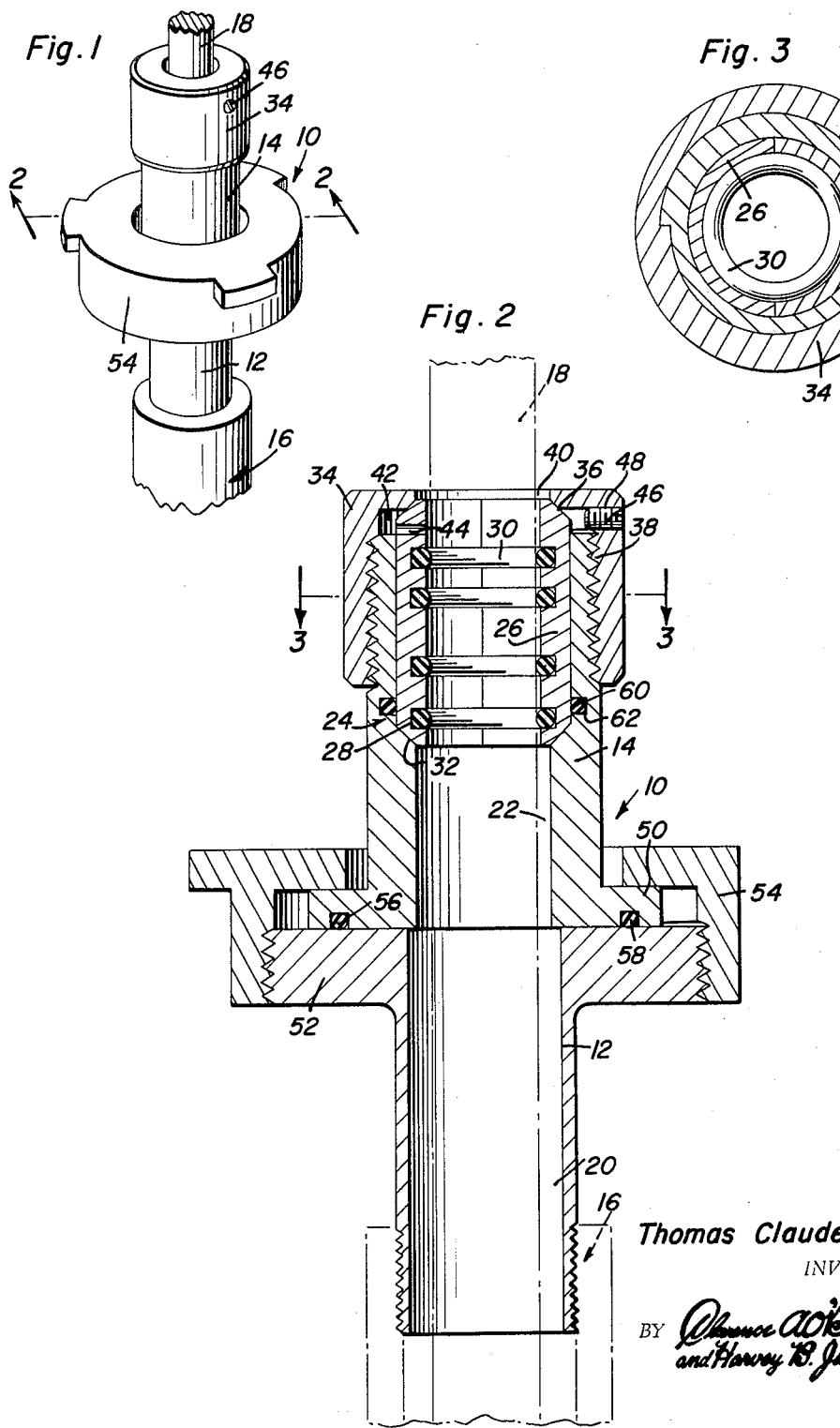

3,244,424
STUFFING BOX
Thomas Claude Cope, Hobbs, N. Mex.
(Box 1444, Andrews, Tex. 79714)
Filed July 19, 1963, Ser. No. 296,230
7 Claims. (Cl. 277—4)

This invention primarily relates to an improvement in polish rod stuffing boxes used in drill strings or the like.

The primary object of this invention is to provide a stuffing box for polish rods used in drilling equipment which not only prevents the flow of fluid under pressure along the rod, but which is self-aligning with the rod.

To accomplish the preceding object, another object of this invention is to provide a movable packing means within said stuffing box in abutting relation about said rod, said packing means including a split cage housing a plurality of O-rings in wiping engagement with said rod. By the use of such O-rings, the friction effect on the polish rod is greatly reduced thereby lengthening the life of expensive oil field equipment.

Still another object of this invention resides in the fact that the split cage containing the O-ring seals can be quickly removed and reinstalled in approximately one minute, thereby reducing the time required for maintenance of the device.

Yet another object of this invention specifically resides in the formation of the stuffing box from a pair of housing portions which are axially aligned, one of said portions carrying the split cage containing the O-rings and the other one of said portions being secured to the drill string and wherein one portion is laterally slidable with respect to the other so that said stuffing box may be aligned with the polish rod which extends therethrough.

A further object of this invention resides in a second embodiment wherein the stuffing box includes a tubular sleeve in which is rotatably mounted a tubular eccentric bushing. The split cage includes an eccentric portion rotatably mounted within the eccentric bushing whereby rotation of said bushing and eccentric portion of said cage within said sleeve defines a plurality of adjusted positions of said split cage and seals relative to the sleeve whereby the stuffing box may be aligned with the polish rod passing therethrough.

A still further object of this invention resides in the provision of lubricant retaining means in said stuffing box adapted to communicate with the split cage and seals for storing and dispensing lubricant between the engagement of said seals and polish rod.

A final object of this invention specifically resides in its simplicity of construction yet effectiveness and efficiency in use and ready adaptability to commercial production.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of one form of the stuffing box comprising the subject matter of the present invention.

FIGURE 2 is a sectional view taken substantially along the plane indicated by the line 2—2 of FIGURE 1.

FIGURE 3 is a cross-sectional view taken substantially along the plane indicated by the line 3—3 of FIGURE 2.

FIGURE 4 is a view similar to FIGURE 2 but illustrating a modified form of the invention.

FIGURE 5 is a sectional view taken substantially along the plane indicated by the line 5—5 of FIGURE 4.

FIGURE 6 is a view similar to FIGURE 5 but illustrating the seal means for encompassing the polish rod moved to an adjusted position.

Referring now to the drawings in detail, and more particularly to the embodiment of the invention illustrated in FIGURES 1–3, one form of the stuffing box is generally designated by the numeral 10. The stuffing box 10 comprises a pair of axially alignable portions 12 and 14 which together combine to form a housing. The housing portion 12 may be threadedly connected to a tubing string as shown by the numeral 16. A polish rod 18 extends through the tubing string 16 and a bore 20 in the housing portion 12 and a bore 22 in the housing portion 14.

In order to prevent the leakage of fluid from the tubing string 16, a suitable packing designated by the numeral 24 is removably mounted within the housing portion 14. The packing comprises a split cage 26, each section of which has a series of axially spaced grooves such as 28. When the split cage 26 is positioned in the housing portion 14, the grooves 28 in each half of the split cage form a contiguous groove. Movably disposed in each one of said continuous grooves is an O-ring 30 which is adapted to be placed in wiping engagement with the polish rod 18 as it slides through the bores 20, 22 in the stuffing box. The seals or O-rings 30 prevent any fluid from leaking or escaping from the tubing string 16 and serve as anti-friction guiding means for the polish rod 18. These rings reduce the friction on the polish rod and thereby greatly lengthen the life of expensive drilling equipment.

The cage 26 is precision machined and seats upon a beveled shoulder 32 in the housing portion 14. A clamping nut 34 bears down on a beveled shoulder 34 of the cage 26 to tightly hold it in non-rotative position upon the beveled seat 32. As shown in FIG. 3, this clamping nut is threaded onto the housing portion 14 at 38. The nut further comprises a central bore 40 allowing for reciprocal movement of polish rod 18 therethrough. Therefore, it should be appreciated that upon removal of the clamping nut 34 the O-ring cage may be readily removed and the O-rings replaced with a minimum of effort within a short time.

In order to prevent burning out of the O-ring packings, a groove 42 is formed beneath the top portion of the nut. A lubricant is adapted to be stored in the groove 42 and dispensed through a transverse bore 44 in one portion of the split cage to the O-rings 30 and polish rod 18. The lubricant in the reservoir or groove 42 may be refilled by removing a plug 46 positioned in an entrance 48 to the reservoir 42.

As frequently occurs, the polish rod 18 will become misaligned with the bores 20, 22 and the O-ring seals 30. The stuffing box 10 comprises adjusting means for aligning the split cage with the rod to maintain the wiping engagement of the seal means therewith regardless of any deviation of the rod from its axially slidable connection with the tubing string. Said means comprises an annular flange 50 formed on the lower portion of the housing portion 14 which is adapted to seat upon a laterally extending flange 52 of the housing portion 12. A clamping spanner nut 54 clamps the flange 50 to the flange 52 during use of the device. However, it should be apparent that when the polish rod 18 is out of line, the spanner nut 54 may be loosened without removing it from the housing portion 12, and the flange 50 may be laterally shifted to align bore 22 with the rod. During this movement, the O-ring seals and the packing 24 will also be aligned with the polish rod. The spanner nut 54 may once again be tightened to hold the parts in aligned position.

A groove 56 is cut in the annular flange 50 of the housing portion 14 and receives a suitable sealing member 58 to prevent lateral leakage of fluid between the mating faces of the flanges 50 and 52. Also, a seal 60 is positioned within a groove 62 to seal the abutting surfaces of the packing means 24 and the surface surrounding the bore 22 of the housing portion 14.

Referring now to the embodiment of the invention illustrated in FIGURES 4 to 6, a housing generally designated by the numeral 70 comprising a tubular sleeve is adapted to be threadedly connected to the tubing string 16. The polish rod 18 is adapted to extend through the bore 72 in the sleeve. The bore 72 is enlarged as shown at 74 and said enlarged portion terminates in a seat 76.

Positioned within the enlarged portion 74 of the bore 72 and seated upon the annular seat 76 is an eccentric bushing 78. The bushing 78 is adapted to rotate through 360° relative to the stationary sleeve or housing 70. The bushing also comprises an offset bore 80 which also includes an enlarged portion 82 terminating in an annular seat 84. Seated upon the seat 84 and positioned within the enlarged portion 82 of the bore 80 is a split O-ring cage 86 similar to the cage 26. Said cage also comprises a plurality of axially spaced contiguous grooves 88 for the reception and seating of a plurality of O-ring seals 90. The cage 86 is also adapted to be rotated through 360° relative to the sleeve 70 and the bushing 78.

As shown in FIGURE 4, the polish rod 18 is adapted to reciprocate axially through the bores 72, 80 and in wiping engagement with the O-ring seals 90. If the polish rod 18 becomes misaligned with the bore 72, thereby destroying the sealing function of the O-rings 90, it is only necessary to rotate the eccentric bushing 78 or the cage 86 to realign and reposition the seals 90 in wiping contact with the polish rod 18. Due to the eccentricities of the bushing 78 and the split cage 86, a greater number of adjusted positions of the O-ring seals 90 may be realized. Two of said positions are shown in FIGURES 5 and 6 respectively.

In order to maintain the parts in aligned position, a flat washer 92 having a central bore 94 for the passage of the polish rod 18 is adapted to be clamped on top of the split cage 86. As seen, the mating surfaces of the washer 92 and cage 86 are beveled. A clamping nut 96 having a threaded connection 98 with the sleeve 70 is adapted to press the washer 92 onto the cage 86. This in turn will hold the cage 86 up against the annular seat 84. The clamping nut 96 also has a bore 100 allowing for the passage of the polish rod 18.

A still further O-ring seal 102 prevents the leakage of fluid at the joint of the eccentric bushing 78 and the seat 76.

It will thus be apparent that a pair of stuffing boxes have been disclosed which greatly increase the life of expensive oil field equipment or the like. The alignment features of said stuffing boxes reduce the friction effect on the pumping equipment by approximately 98%. Further, pumps have gone from 8 to 14 hours with the aforementioned stuffing boxes and require no lubrication, and being free from packing trouble in any manner. The use of the plurality of axially spaced O-ring seals renders the device practically leak-proof and quite efficient in operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a polish rod substantially axially slidable within a string of tubing, a stuffing box surrounding said rod and secured to said tubing for sealing the sliding connection between said rod and tubing, said stuffing box comprising housing means secured to the tubing string, removable packing means disposed within said housing means in abutting relation about said rod, said packing means including split cage means having a series of axially spaced, contiguous grooves, seal means positioned within said grooves in wiping engagement with said rod, means for clamping said split cage means about said rod and adjusting means for aligning said split cage means with said rod to maintain the wiping engagement of said seal means therewith regardless of any deviation of said rod from its axially slidable connection with said tubing string.

2. The combination of claim 1 wherein said seal means includes a plurality of O-rings.

3. The combination of claim 1 wherein said housing means includes a pair of axially alignable portions, one of said portions carrying said split cage means and the other one of said portions being secured to the tubing string, said adjusting means including laterally slidable flange means on said one portion seated on said other portion and clamping nut means for securing said flange means to said other portion.

4. The combination of claim 3 wherein said clamping nut means includes a spanner nut.

5. The combination of claim 1 including lubricant retaining means between said clamping means and housing means communicating with said split cage and seal means for storing and dispensing lubricant between the engagement of said seal means and polish rod.

6. The combination of claim 1 wherein said housing means includes a tubular sleeve, said adjusting means including a tubular eccentric bushing rotatably mounted within said sleeve, said split cage means including an eccentric portion rotatably mounted within said eccentric bushing whereby rotation of said eccentric bushing and eccentric portion of said cage means within said sleeve defines a plurality of adjusted positions of said split cage and seal means relative to said sleeve.

7. The combination of claim 6 wherein said eccentric bushing and eccentric split cage means are each rotatable 360° relative to said tubular sleeve.

References Cited by the Examiner

UNITED STATES PATENTS

| | | | |
|---|---|---|---|
| 1,911,670 | 5/1933 | Black | 277—30 |
| 2,119,244 | 5/1938 | Pranger | 277—100 |
| 2,625,413 | 1/1953 | Christensen | 277—184 |
| 2,874,983 | 2/1959 | Densmore | 277—4 |
| 3,186,724 | 6/1965 | Wheateley | 277—105 X |

LAVERNE D. GEIGER, *Primary Examiner.*